even though the glass coating of the present invention is highly satisfactory in itself.

United States Patent Office 3,544,396
Patented Dec. 1, 1970

3,544,396
SILICON STEEL COATED WITH MAGNESIA CONTAINING CHROMIC OXIDE
David W. Taylor, Middletown, Ohio, assignor to Armco Steel Corporation, Middletown, Ohio, a corporation of Ohio
No Drawing. Filed Aug. 28, 1967, Ser. No. 663,543
Int. Cl. H01f 1/18
U.S. Cl. 148—111                                6 Claims

ABSTRACT OF THE DISCLOSURE

An annealing separator for silicon steel consisting essentially of magnesium oxide (MgO) and from about 1% to about 20% of chromic oxide ($Cr_2O_3$) by weight; and a method of making silicon steel wherein sheet stock at final gauge and prior to a final high temperature anneal is coated with an annealing separator consisting essentially of magnesium oxide and from about 1% to about 20% of chromic oxide by weight, whereby to produce a product with a superior insulative glass coating. The annealing separator may also contain from about 0.1% to about 1% of calcium oxide by weight.

BACKGROUND OF THE INVENTION

Field of invention

The invention relates to an annealing separator for silicon steel, and more particularly to an annealing separator consisting essentially of magnesium oxide and additions of chromic oxide. The invention further relates to a method of making silicon steel wherein the annealing separator of the present invention is utilized to produce a final product having improved magnetic properties and a glass coating exhibiting superior oxidation resistance.

The teachings of the present invention are applicable to the production of silicon steel for magnetic uses and more particularly to the production of silicon steel of the type having a glass coating.

The term "silicon steel" is intended to include both oriented and non-oriented silicon steels and, as used herein, relates to a material containing about 2% to about 4% silicon, an initial carbon content of not more than about .040%, an initial sulfur (or selenium) content of not more than about .03%, manganese in the range of about .02% to about .4%, and an aluminum content of not more than about .40%, the balance being iron with phosphorus, copper and such other impurities as are usual in the manufacture of silicon steel in the basic open hearth furnace, electric furnace, or the various oxygen blowing processes.

The term "glass coating," as used herein, means the coating which is formed on the surfaces of silicon steel by a reaction between silica on the surfaces of the silicon steel and magnesia from the annealing separator. The composition of the "glass" is complex but is thought to be largely magnesium silicate combined with various impurities present in the magnesia and the steel.

Description of the prior art

Various processes for producing silicon steel sheet stock are well known in the art. The initial melt composition, the nature and sequence of the processing steps, and other processing factors will depend upon the desired nature and properties of the final product. In general, however, processes for producing silicon steel include the steps of hot reducing the silicon steel, removing scale, cold rolling to final gauge and subjecting the stock to a final anneal. Usually the routing includes a decarburizing anneal as well.

In many uses of silicon steels, a final product having a surface film or glass providing electrical resistivity and protection against oxidation or carburization is advantageous. For example, glass coated silicon steels are often used in the manufacture of cores for magnetic apparatus.

While it is within the scope of the present invention to provide an improved glass coating on silicon steel by means of a separate processing step, prior art workers have recognized the fact that it is more desirable and cheaper to provide a glass coating as a part of the production process, when the provision of such a coating does not interfere with the achievement of the desired magnetic characteristics of the final product.

Practices for producing a glass film during the high temperature final anneal depend upon first producing a surface silica layer on the steel prior to the coating of the steel with an annealing separator such as magnesia. This silica layer is generally produced during a decarburization step. The silica layer reacts with the magnesia coating during the final high temperature anneal and forms a magnesium silicate glass film on the steel surfaces.

As disclosed in U.S. Letters Patent No. 2,354,123 to Horstman et al., it has long been known that a magnesia separator under proper conditions will form a glass film on the surfaces of silicon steel. This reference taught the coating of pre-oxidized silicon steel sheets with a magnesia annealing separator containing silica additions. U.S. Letters Patent No. 2,394,047 to Elsey et al. taught that an oxidizing agent such as calcium hydroxide or a metallic carbonate or hydroxide may be added to a magnesia annealing separator containing silica thus eliminating the necessity of pre-oxidizing the silicon steel. These patents represent another approach to the problem of forming additional glass on the steel surfaces.

Heretofore, however, the silicon steel sheet stock, after the final anneal, was frequently characterized by a discoloration, generally known as "oxide pattern." The discoloration appeared particularly at or near the edges of the sheet stock, and hence has come to be known as "oxide border." The "oxide border" phenomenon is largely the result of the presence on the silicon steel sheet stock of an oxide scale, primarily iron oxide. Much of this oxidation can occur at the end of the final anneal if the steel is exposed to oxygen in the surrounding air by removing the annealing furnace while the steel is still at an elevated temperature. As a result, it was heretofore believed necessary to allow the steel to cool to 1000° F. or below before removing the annealing furnace.

Heretofore, such glass coated steels normally possessed sufficient insulative qualities. However, they were capable of being severely damaged magnetically by anneals subsequent to the final anneal (such as stress relief anneals) practiced by manufacturers of transformers and the like, often in atmospheres and under operating conditions conducive to oxidation and carbon pick-up. The product, having been subjected to such subsequent anneals, frequently demonstrated the presence of oxide scale and internal oxidation of silicon just below the surface. In addition, carbon pick-up often occurred and the carbon precipitated as small carbide particles, resulting in increased watt loss and further deterioration of the magnetic properties (known in the art as magnetic aging).

It has been discovered, however, that if chromic oxide ($Cr_2O_3$) is added to the magnesia separator, additional silica is formed which will react with the magnesia to form a more continuous silicate glass on the silicon steel surface. As a result, an improved glass coating can be formed, characterized by substantial elimination of the "oxide border" and by better protective properties against oxidation or carburization of the silicon steel. Practice of the present invention also provides a better surface for a subsequent application of additional insulative coatings, when desired. Such additional coatings may be added as taught in U.S. Letters Patent No. 2,501,846 to Gifford.

Various chromium compounds, including $Cr_2O_3$ have been used previously in combination with other ingredients to form a coating on ferrous surfaces. For example, it is taught in U.S. Letters Patent No. 2,144,425 of Cook that $Cr_2O_3$ may be used as a pigment to react with a phosphate binder. Chromic oxide has also been suggested as an inert filler when phosphate coatings are applied later by a burning-in process. A coating of about 55% $Cr_2O_3$ and 45% CaO has been recommended as having superior electrical properties compared to the normal magnesia coating. In addition, chromic acid anhydride has been used with magnesia in a proportion of 2.4 parts $CrO_3$ to one part MgO as a core-plating agent. However, the present invention is limited to the use of chromic oxide ($Cr_2O_3$) in critically small amounts to a magnesia coating. Other ingredients, when added, consist only of a very small amount of calcium oxide (CaO) and a grain growth inhibitor, if it is needed in producing grain-oriented silicon steel. The use of further coating ingredients or of an after-treatment, affecting the properties of the coating produced by the practice of the invention, are not necessary and are not contemplated within the scope of the invention.

SUMMARY OF THE INVENTION

In accordance with the present invention silicon steel is provided with a glass coating either as a separate process step or preferably as a part of the silicon steel production process itself. In the practice of the invention the silicon steel is coated with a glass-forming magnesia annealing separator prior to the final high temperature anneal. To the annealing separator additions of chromic oxide powder are made (in amounts taught below) resulting in a final product having a superior and more continuous glass coating and improved magnetic qualities. When desired, the annealing separator of the present invention may also contain other additives such as calcium oxide and/or a primary grain growth inhibitor (such as sulfur, selenium, or compounds thereof).

DESCRIPTION OF THE PREFERRED EMBODIMENTS

For purposes of an exemplary showing, the annealing separators taught herein will be described with respect to their application to the silicon steel sheet stock prior to the final anneal of the silicon steel production process, and hence prior to the development of the final magnetic properties of the stock. It will be understood by one skilled in the art (as indicated above) that the annealing separators may be used in association with a separate glass-forming step where desired.

The magnesia separator referred to herein will be understood to comprise magnesia which has been either partially or completley hydrated to magnesium hydroxide. In the preferred embodiment of the present invention the magnesia is applied to the silicon steel in a water slurry, forming a coating having not more than 12% combined water, as taught in U.S. Letters Patent No. 2,906,645 in the name of Carpenter et al.

During the final anneal the magnesia separator serves several functions. It prevents the sticking of adjacent sheets or convolutions of the silicon steel, it promotes desulfurization of the steel, and it reacts with the steel to form a magnesium silicate or glass coating on the stock surface. It has been discovered that additions of chromic oxide to the magnesia separator tend to improve the properties of the surface glass on the final product and the magnetic properties of the final product without interfering with the other functions of the magnesia separator.

While not wishing to be bound by theory, it is believed that during the final anneal the chromic oxide reacts with the silicon in the steel, resulting in the production of chromium metal and additional silica. The chromium diffuses into the silicon steel, while the additional silica formed reacts with the magnesia to form a more continuous silicate glass on the silicon steel surface. This more protective glass coating results in the significant reduction or elimination of oxide pattern or oxide border and permits removal of the annealing furnace at higher temperatures. The glass coating maintains its integrity throughout subsequent flattening anneals, stress relief anneals and the like. The glass coating displays an improved protection against oxidation or carburization of the silicon steel, and presents a more uniform edge-to-edge surface for subsequent application of additional insulative coatings when desired. Finally, the silicon steel itself displays improved magnetic qualities, as will be shown in examples given below.

The optimum amount of the chromium oxide additions to the magnesia separator is affected by a number of factors, including coating weights of the separator, the type of magnesia powders used, and the nature of the various treatments in the processing prior to the magnesia coating.

The chromium oxide additions should constitute from about 1% to about 20% of the total weight of the magnesia separator. The preferable range is from about 1% to about 15%. These values are for an annealing separator coating weight of about .030 ounce per square foot of silicon steel sheet.

It has further been discovered that at the high concentrations of chromium oxide in the separator (i.e. above 15%), the surface of the silicon steel becomes microscopically roughened and inferior interlaminar resistivities may be produced. At the low concentrations of chromium oxide (i.e. below about 5%), continuous glass coatings are less likely to be produced.

Certain benefits may be derived from the addition of calcium oxide to the annealing separator. The use of calcium oxide is, however, subject to certain limitations. Calcium oxide has a tendency to combine with carbon dioxide from the air or from other sources to form calcium carbonate. During a subsequent high temperature anneal, the calcium carbonate will dissociate to form calcium oxide and carbonaceous gases. The carbonaceous gases themselves will dissociate, and will recarburize the silicon steel, resulting in undesirable magnetic characteristics including aging. Thus, carbon pick-up may constitute a major obstacle in the use of high calcium oxide additions. However, benefits which may be derived from the addition of calcium oxide may be realized when calcium oxide is added to the separator in amounts which will not cause inferior magnetic properties. Thus, when desired, it is within the scope of the present invention to add from about 0.1% to about 1% of calcium oxide by weight to the separator. Such calcium oxide additions tend to improve the interlaminar resistivity of the glass coated steels without adversely affecting magnetic aging.

When the silicon steel being produced is intended to have a final orientation of the type derived by a grain boundary energy mechanism, it is within the scope of the invention to add to the annealing separator a primary grain growth inhibitor (such as sulfur, selenium, or compounds thereof) in accordance with U.S. Letters Patent No. 3,333,992 in the name of Kohler.

In the practice of the invention, chromic oxide powder and, if desire, calcium oxide or a grain growth inhibitor may be mixed with the dry magnesia or the magnesia slurry prior to the coating of the silicon steel strip. Alternatively, the chromic oxide powder may be applied on top of the strip after it has been coated with magnesia. The former method is preferred, since it enables a greater degree of control.

Examples of the practice of the invention will now be given, it being understood that they are illustrative only and are not intended as a limitation on the invention.

EXAMPLE I

Samples of decarburized 3% silicon steel, .011″ thick, were coated with magnesia containing from 0% to 100% chromic oxide ($Cr_2O_3$). The samples were box annealed in a dry hydrogen atmosphere at 2200° F. for twenty-four hours. After the anneal, the excess coating separator was scrubbed from the surface and the samples were tested for magnetic quality and oxidation resistance.

Core loss values were determined at an induction power (P) of 15 and 17 kilogausses and a frequency of 60 cycles per second. Permeabilities were measured at a magnetizing force (H) of 10 oersteds.

As shown in Table I, chromic oxide additions from 1% to 20% were beneficial to the magnetic quality when compared with samples containing no additions and additions greater than 20%. Low core losses, high permeabilities, and high negative magnetostrictions are desirable. Surface resistivities as measured with a Franklin tester, which should be less than .40 ampere for this grade of silicon steel, were improved with chromic oxide additions of from 1% to 15%. There was a gradual deterioration of surface resistivity as the additions increased above 15% $Cr_2O_3$.

TABLE I

| Percent $Cr_2O_3$ in MgO | Core loss watts/lb. P15:60 | Core loss watts/lb. P17:60 | Permeability H-10 | Magnetostriction 15 kga. | Franklin amps. |
|---|---|---|---|---|---|
| 0 | .506 | .745 | 1,825 | −74 | .39 |
| 1 | .498 | .733 | 1,838 | −93 | .19 |
| 2 | .497 | .728 | 1,838 | −94 | .15 |
| 5 | .495 | .724 | 1,840 | −97 | .15 |
| 10 | .486 | .701 | 1,837 | −99 | .18 |
| 15 | .482 | .697 | 1,839 | −102 | .29 |
| 20 | .487 | .707 | 1,835 | −101 | .35 |
| 25 | .481 | .691 | 1,838 | −100 | .48 |
| 50 | .522 | .745 | 1,822 | −104 | .51 |
| 100 | .565 | .803 | 1,803 | −40 | .57 |

Small strips of each sample were heated in air at 1450° F. for about thirty minutes to determine the oxidation resistance afforded by the glass coatings. Samples with 0% and 100% $Cr_2O_3$ were heavily oxidized. The severity of oxidation was lowered with chromic oxide additions up to 5% and the samples coated with 10% to 20% $Cr_2O_3$ had essentially no oxidation.

The results show that chromic oxide additions to magnesia produce a superior glass coating on silicon steels. The improved glass coating provides better protection to the steel from adverse surface reactions and also improves the magnetic quality of the silicon steel.

EXAMPLE II

Three coils of silicon steel were processed to a final thickness of .011" by a standard two-stage cold rolling process. The ladle analysis of the starting material was as follows:

| | Percent |
|---|---|
| Carbon | .028 |
| Manganese | .084 |
| Phosphorus | .003 |
| Sulfur | .025 |
| Silican | 3.06 |

The cold rolled coils were open annealed in a wet hydrogen atmosphere, reducing to iron, to decarburize the steel. Coil 1 was coated with a magnesia slurry containing no additives. Coil 2 was coated with a slurry containing an addition of 10% by weight of chromic oxide powder based on the weight of the dry magnesia. Coil 3 was coated with a slurry containing additions of 10% by weight of chromic oxide and 0.75% by weight of calcium oxide. These coils were box annealed in a hydrogen atmosphere at 2200° F. for twenty-four hours.

After the box anneal the excess magnesia powder was scrubbed off and the silicon steel strips were examined for quality of the glass film. The coil with no additives had bands of surface oxidation near both edges of the strip (oxide border). The two coils with additives, which received identical treatment, displayed no oxide border. Samples from near the mid-width position of the three coils were further tested by heating in air at 1500° F. for about ten minutes. The samples with additives to the magnesia remained unchanged, while the samples without additives were darkened because of oxidation of the steel. The glass film produced by magnesia without the additives was not sufficiently continuous to prevent oxidation. The glass film produced by magnesia with the additives was continuous and protected the steel from oxidation.

Representative magnetic tests from the three coils are shown in Table II below:

TABLE II

| Coil No. | Additions | Core loss watts/lb. P15:60 | Core loss watts/lb. P17:60 | Permeability H-10 | Magnetostriction 15 kga. |
|---|---|---|---|---|---|
| 1 | None | .510 | .730 | 1,830 | −16 |
| 2 | 10% $Cr_2O_3$ | .510 | .715 | 1,835 | −76 |
| 3 | 10% $Cr_2O_3$+¾% CaO | .495 | .720 | 1,840 | −70 |

These data show that the additives were beneficial to core losses. An appreciable benefit was obtained with respect to magnetostriction, a high negative value being desirable.

EXAMPLE III

Twelve coils were processed to a final thickness of .011" by a standard two-stage cold rolling process to produce cube-on-edge oriented silicon steel. The ladle analyses of the starting materials were as follows:

| | Percent |
|---|---|
| Carbon | .027–.030 |
| Manganese | .082 |
| Phosphorus | .003–.005 |
| Sulfur | .025–.026 |

The cold rolled coils were open annealed in a wet hydrogen atmosphere reducing to iron to decarburize the steel. Six coils were coated with magnesia containing 8% by weight of chromic oxide and the other six coils were coated with magnesia containing 8% by weight of chromic oxide plus 0.5% by weight of calcium oxide. These coils were box annealed in a hydrogen atmosphere at 2200° F. for twenty-four hours.

After the box anneal the excess magnesia powder was scrubbed off and the glass coated steel was examined. The steel strips were substantially free of oxide border and were of uniform appearance from edge to edge. The surface resistivities of the coils with both calcium oxide and chromic oxide additions were better than with chromic oxide alone, as shown in Table III below.

TABLE III

| Coating additions: | Average surface resistivity (ohms) |
|---|---|
| 8% $Cr_2O_3$ | 8 |
| 8% $Cr_2O_3$+0.5% CaO | 13 |

Modifications may be made in the invention without departing from the spirit of it.

The embodiments of the invention in which an exclusive property or privilege is claimed are defined as follows:

1. In a process of producing silicon steel stock comprising the steps of hot reducing the silicon steel, removing the scale, cold rolling to final gauge and subjecting the stock to a final anneal; the improvement comprising the step of coating said stock prior to said final anneal with an annealing separator consisting essentially of magnesium oxide and from about 1% to about 20% of chromic oxide by weight.

2. The process claimed in claim 1 including the step of adding to said annealing separator from about 0.1% to about 1% calcium oxide by weight.

3. The process claimed in claim 1 including the step of adding to said annealing separator sulfur or selenium or compounds thereof as a primary grain growth inhibitors whereby to produce a silicon steel stock having a final orientation of the type derived by a grain boundary energy mechanism.

4. Silicon steel sheet stock containing about 2% to about 4% silicon and having on its surface a continuous glass coating formed by coating silicon sheet stock with an annealing separator consisting essentially of magnesium oxide and from about 1% to about 20% of chromic oxide by weight, and thereafter subjecting said coated stock to a final high temperature anneal.

5. The silicon steel sheet stock claimed in claim 4 wherein said annealing separator includes from about 0.1% to about 1% calcium oxide by weight.

6. The silicon steel sheet stock claimed in claim 4 and having a final orientation of the type derived by a grain boundary energy mechanism wherein said annealing separator includes the addition of sulfur or selenium or compounds thereof as a primary grain growth inhibitor.

References Cited

UNITED STATES PATENTS

| | | | |
|---|---|---|---|
| 3,160,509 | 12/1964 | Schaefer et al. | 148—113 X |
| 3,211,576 | 10/1965 | Forslund et al. | 148—113 X |
| 3,331,713 | 7/1967 | Miller | 148—113 |
| 3,333,991 | 8/1967 | Kohler | 148—113 X |
| 3,379,581 | 4/1968 | Kohler | 148—113 |

FOREIGN PATENTS

| | | | |
|---|---|---|---|
| 25,465 | 11/1964 | Japan | 148—20.6 |

OTHER REFERENCES

Handbook of Chemistry and Physics, 46th ed., 1965, p. B-168.

L. DEWAYNE RUTLEDGE, Primary Examiner

G. K. WHITE, Assistant Examiner

U.S. Cl. X.R.

148—31.5, 31.55, 112, 113